Sept. 8, 1959  M. WELLS  2,903,568
ELECTRODE HOLDER
Filed Aug. 7, 1956
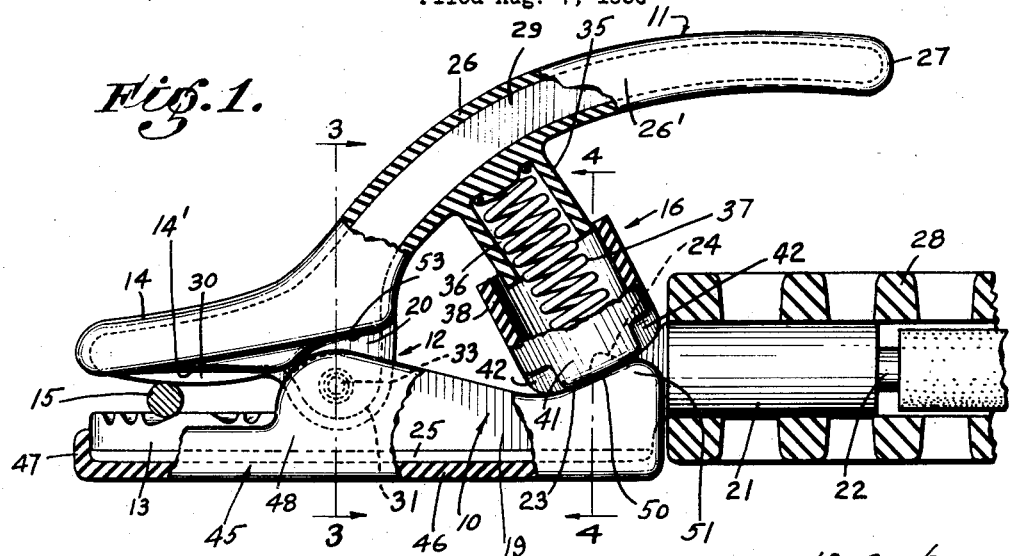
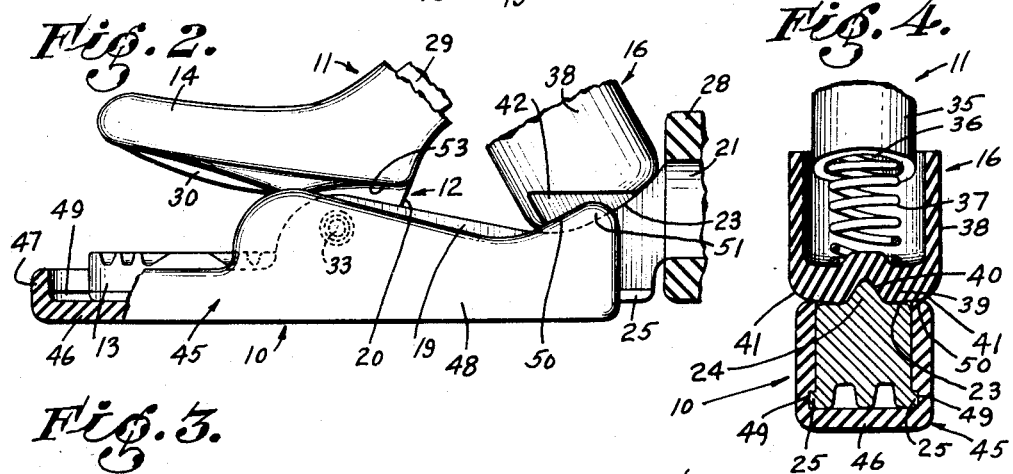
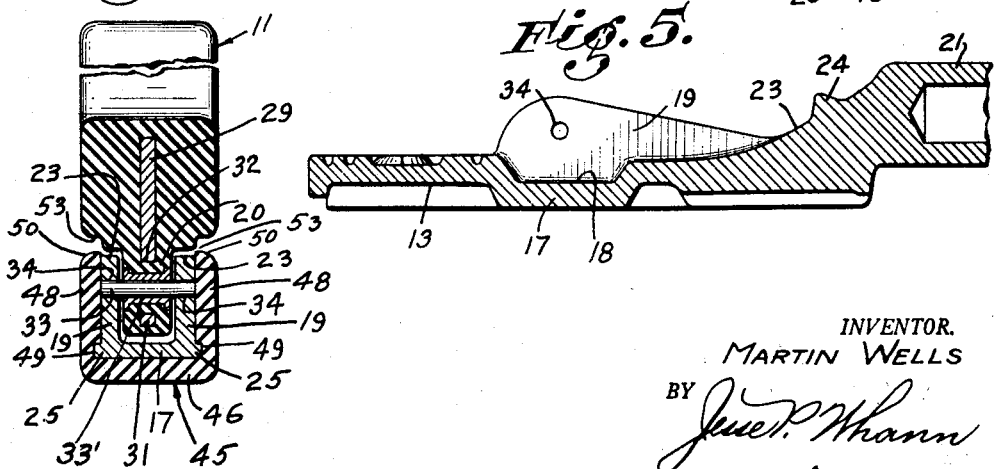
INVENTOR.
MARTIN WELLS
BY
ATTORNEY United States Patent Office 2,903,568
Patented Sept. 8, 1959

2,903,568

ELECTRODE HOLDER

Martin Wells, Pasadena, Calif.

Application August 7, 1956, Serial No. 602,597

18 Claims. (Cl. 219—138)

My invention relates to welding rod gripping means commonly referred to as a welding rod holder for connecting to the end of an electric cable the welding rod employed in the electric welding process.

It is an object of the invention to provide a welding rod holder having lever members hinged near the forward ends thereof and having jaw parts arranged to grip a welding rod when the rearward portions of the levers are swung apart from each other by spring means, one of the lever members having at the rear end thereof a handle and also means for connecting the electric cable of the welding equipment thereto, this welding rod holder being characterized by having a simple and effective insulator means for the levers and also for the spring means which urge the levers into rod gripping positions, for preventing the metal parts of the levers from being grounded and forming an arc as the result of contact with the part being worked upon or with other metal which is grounded.

It is a further object of the invention to provide a welding rod holder wherein the lever which is connected to the electric cable is made of electro-conductive metal such as copper or an alloy thereof, and the other lever is made of molded insulating material reinforced by a metal reinforcing strip which is isolated from the first lever so that it does not make electrical contact therewith. Accordingly, in the use of this electrode holder, there is no current flow in one of the levers, but the entire flow of welding current is through the remaining lever to the welding rod which is gripped between the jaw elements at the forward ends of the levers.

It is a further object of the invention to provide a welding rod holder of the character described herein in which the levers are held hingedly together by a transverse hinge pin, and having an effective insulator for the current-conducting lever, this insulator being provided with walls arranged to prevent removal of the hinge pin from its operative position by covering the ends of the hinge pin.

It is a further object of the invention to provide an electrode holder having simple means for holding the removable insulator in position on the lever which it protects.

A further object of the invention is to provide in this electrode holder a part which not only serves to protect the spring means which spreads the levers, but also prevents removal of the removable insulator, the part being adjustable into a position wherein removal of the insulator is permitted.

Further objects and advantages of the invention may be brought out in the following part of the specification wherein details have been described for the purpose of provding a competent disclosure, without intending to limit the scope of the invention which is defined by the accompanying claims.

Referring to the accompanying drawings which are for illustrative purposes only:

Fig. 1 is a partly sectioned elevational view of a preferred form of the invention.

Fig. 2 is a fragmentary elevational view of the leftward portion of Fig. 1, showing the adjustment of the parts so that the insulator may be removed from the current conducting lever.

Fig. 3 is a sectional view taken as indicated by the line 3—3 of Fig. 1.

Fig. 4 is a fragmentary sectional view taken as indicated by the line 4—4 of Fig. 1.

Fig. 5 is a longitudinal section through the metal current-conducting lever of the electrode holder.

As shown in Fig. 1, the welding for holder comprises first and second levers 10 and 11, connected by hinge means 12, and having jaws 13 and 14 at the forward ends thereof between which a welding rod 15 is gripped when the jaws 13 and 14 are urged toward each other by the action of spreading means 16 arranged between the rearward portions of the levers 10 and 11 so as to spread apart these rearward portions and thereby move the jaws 13 and 14 toward each other.

As shown in Figs. 3 and 5, the lever 10 comprises a wall 17 which is of electro-conductive metal and which extents from end to end of the lever 10. Between the ends thereof, but closer to the front end, the lever 10 has an upwardly faced depression 18 and upwardly projecting side walls 19 on opposite sides of the depression 18 and in parallel relation to each other so as to define a space to receive the hinge portion 20 of the lever 11. At its rear end, the lever 10 has a tubular cable connector 21 arranged to receive, as shown in Fig. 1, the end of the electrical cable 22 of an electric welding device, not shown. On the rearward portion of the lever 10 adjacent the cable connector 21 there is a sloping surface 23 from which a conical projection 24 extends. As shown in Figs. 1 and 4, longitudinally extending ribs or guides 25 are forged along the lower edges of the lever 10.

The lever 11 is molded from an insulating material 26 such as Bakelite, for example, and is curved upwardly and then rearwardly from the hinge portion 20 thereof so that its rear end 27 will be in spaced relation to the cable connector 21 and the handle 28 which is secured on the cable connector 21. Also, the portion 26' of the lever 11, lying between the hinge portion 20 and the rear end 27, is approximately parallel to the surface 23 of the lever 10. A feature of the lever 11 is that it has therein a reinforing metal strip 29 of a shape corresponding to the shape of the lever 11, but being of reduced area so that it will be completely encased by the insulating material 26 except for the small portion 30 at the lower part of the leftward of forward end of the reinforcing strip 29 which projects downwardly from the lower face 14' of the jaw 14 so as to be positioned for engagement with the upper rounded surface of the welding rod 15. A portion 31 of the reinforcing strip 29 extends downwardly into the hinge portion 20 of the lever 11, as shown in Fig. 3, and has therein an opening 32 which is concentric with, but larger than, the diameter of the hinge pin 33 which projects through the hinge portion 20 of the lever 11 and has its ends received by pin openings 34 in the side walls 19 of the lever 10.

The lever 11 has an integrally molded wall 35 of insulating material projecting downwardly from the portion 26' thereof toward and substantially aligned with the projection 24. The wall 35 is tubular and defines a cavity 36 which receives the upper part of a coil spring 37. A cup 38, molded also from insulating material, receives the part of the spring 37 which projects from the tubular wall 35. The cup 38 has an internal diameter larger than the external diameter of the tubular wall 35 and receives the lower portion of the tubular wall 35, as shown in Fig. 1. The cup 38 has an approximately flat bottom wall 39 with a central socket or recess 40 to receive the projection 24, and the lower end of the cup 38 has diametrally opposed shoulders 41 projecting beyond the side faces of the lever 10. The lower end of the cup 38 has diametrally opposed notches 42 which are arranged between the shoulders 41, as shown in Figs. 1 and 2. The cup 38 is shown in Fig. 2 rotated 90 degrees from the position in which it is shown in Fig. 1.

A replaceable insulator 45, as shown in Fig. 1, covers the bottom, end and sides of the lever 10. This insulator 45 is molded from a durable insulating material and has a bottom wall 46, end wall 47 and side walls 48 which have at the lower edges of their inner faces channels 49 to receive the ribs 25 of the lever 10 as the insulator 45 is slid endwise onto the lever 10, passing through the position in which it is shown in Fig. 2 to the position in which it is shown in Fig. 1. The side walls 48 of the insulator 45 have the same general contour as the side faces of the lever 10 which they cover; therefore, the rearward portions of the side walls 48 have upper edges 50 of the same slope as the upper surface 23 of the lever 10, and as shown in Figs. 1 and 4, lie under the projecting shoulders 41 of the connector part or cup 38 of the spreader means 16, when the cup is positioned with its shoulders 41 extending laterally beyond the side faces of the lever 10. Being thus positioned with relation to the side wall upper edges 50, the shoulders 41 serve as stops or obstructions which prevent leftward movement of the insulator 45 from the position in which it is shown in Fig. 1.

Rotation of the cup 38 ninety degrees in clockwise direction from the position in which it is shown in Fig. 2 will bring the notches 42 into alignment with the edges 50 so that the rear upper ends 51 of the side walls 48 may pass through the notches 42, as shown in Fig. 2, enabling the insulator 45 to be slid outwardly (leftwardly) off from the lever 10. As shown in Figs. 1 and 3, the lever 11 has notches 53 providing clearances for the upper edges of the side walls 48 as the insulator 45 is moved on or off the lever 10. When a replacement insulator has been slid onto the lever 10, the cup 38 is rotated from the position in which it is shown in Fig. 2 to the position in which it is shown in Fig. 1, thereby disposing the shoulders 41 so that they will prevent removal of the insulator 45 from its position protecting the lever 10.

A feature of the invention is that no electric current passes through the hinge pin 30, which, however is supported by metal parts. The ends of the pin 33 are supported by the side walls 19 of the lever 11 and the intermediate portion of the pin 53 passes through a flanged metal tube 33' which is molded in the hinged portion 20 of the lever 11, and is insulated from the portion of the surrounding portion of the hinge portion 31 of the reinforcing strip 29. A further feature of the invention is the balance of the holder achieved by offsetting the handle 28 and the cable connecting part 21 upwardly with relation to the forwardly extending portion of the lever 10 so that its axis is approximately aligned with the hinge means 20 of the lever 11.

I claim as my invention:

1. In a welding rod holder: first and second levers hingedly connected intermediate the ends thereof, said levers having jaw elements at the front ends thereof to grip a welding rod; a cable connector at the rear end of one of said levers; an insulator slidable onto said first lever; and spreader means between the rear ends of said levers for swinging said levers so as to cause said jaw elements to swing toward each other and grip a rod therebetween, said spreader means having a part positioned so as to engage said insulator and prevent its removal from its position on said first lever.

2. In a welding rod holder: first and second levers hingedly connected intermediate the ends thereof, said levers having jaw elements at the front ends thereof to grip a welding rod therebetween; a cable connector at the rear end of one of said levers; an insulator slidable onto said first lever; spreader means between the rear ends of said levers for swinging said levers so as to cause said jaw elements to swing toward each other and grip the rod therebetween; and a rotatable member on one of said levers having a part positioned when said rotatable member is in one of its positions to engage and prevent removal of said insulator from its position on said first lever.

3. In a welding rod holder: first and second levers hingedly connected intermediate the ends thereof, said levers having jaw elements at the front ends thereof to grip a welding rod; a cable connector at the rear end of one of said levers; an insulator slidable onto said first lever; and spreader means between the rear ends of said levers for swinging said levers so as to cause said jaw elements to swing toward each other and grip the welding rod therebetween, said spreader means comprising a spring member and a connector part connecting said spring member to said first lever, said connector part being movable between first and second positions and having a wall acting when said connector part is in said second position to engage said insulator and prevent its removal from said first lever.

4. In a welding rod holder: first and second levers hingedly connected intermediate the ends thereof, said levers having jaw elements at the front ends thereof to grip a welding rod; a cable connector at the rear end of one of said levers; an insulator slidable onto said first lever; and spreader means between the rear ends of said levers for swinging said levers so as to cause said jaw elements to swing toward each other and grip a rod therebetween, said spreader means comprising a spring member and a connector part connecting said spring member to said first lever, said part being rotatable between first and second positions and having a shoulder positioned when said connecting part is in said second position thereof to engage said insulator and prevent its removal from said first lever.

5. In a welding rod holder: first and second levers hingedly connected intermediate the ends thereof, said levers having jaw elements at the front ends thereof to grip a welding rod; a cable connector at the rear end of one of said levers; and an insulator slidable onto said first lever; and spreader means between the rear ends of said levers for swinging said levers so as to cause said jaw elements to swing toward each other and grip a rod therebetween, said spreader means comprising a spring member, one end of which engages said second lever, and a cup receiving the other end of said spring member and engaging said first lever, said cup being rotatable between first and second positions and having a shoulder positioned when said cup is in said second position to engage said insulating member and prevent its removal from said first lever.

6. In a welding rod holder: first and second levers hingedly connected intermediate the ends thereof, said levers having jaw elements at the front end thereof to grip a welding rod; a cable connector at the rear end of one of said levers; an insulator slidable onto said first lever; and spreader means between the rear ends of said levers for swinging said levers so as to cause said jaw elements to swing toward each other and grip a rod therebetween, said spreader means comprising a spring member one end of which engages said second lever, a tubular wall of insulating material projecting from said second lever and surrounding the portion of said spring adjacent said second lever, and a cup receiving the other end of said spring member and engaging said first lever, said cup being rotatable between first and second positions and having a shoulder positioned when said cup is in said second position to engage said insulating member and prevent its removal from said first lever.

7. In a welding rod holder: first and second levers hingedly connected intermediate the ends thereof, said levers having jaw elements at the front ends thereof to grip a welding rod, said first lever being of electroconductive metal and said second lever being of molded insulating material and having a metal reinforcing strip therein, said reinforcing strip being isolated from said first lever so that no electric current flows in said sceond lever; a cable connector at the rear end of said first lever; and spreader means between the rear ends of said levers for swinging said levers so as to cause said jaw elements to swing toward each other and grip a welding rod therebetween, said spreader means having a part positioned so as to engage said insulator and prevent its removal from its position on said first lever.

8. In a welding rod holder: first and second levers hingedly connected intermediate the ends thereof, said levers having jaw elements at the front ends thereof to grip a welding rod, said first lever being of electroconductive metal and said second lever being of molded insulating material and having a metal reinforcing strip therein, said reinforcing strip being isolated from said first lever so that no electric current will flow in said second lever; a cable connector at the rear end of said first lever; an insulator slidable onto said first lever; and spreader means between the rear ends of said levers for swinging said levers so as to cause said jaw elements to swing toward each other and grip the rod therebetween, said spreader means comprising a spring member one end of which engages said lever, a tubular wall of insulating material projecting from said second lever and surrounding the portion of said spring adjacent said second lever, and a cup receiving the other end of said spring member and engaging said first lever, said cup being rotatable between first and second positions and having a shoulder positioned when said cup is in said second position to engage said insulator and prevent its removal from said first lever.

9. A rod holder as defined in claim 8 wherein said levers are hingedly connected by a transverse hinge pin and said insulator has thereon wall means positioned so as to prevent removal of said hinge pin from its operative position.

10. In a welding rod holder: first and second levers hingedly connected intermediate the ends thereof, said levers having jaw elements at the front ends thereof to grip a welding rod, said first lever being of electroconductive material and said second lever being of molded insulating material and having a reinforcing strip therein, said reinforcing strip being isolated from said first lever so that no electric current will flow in said reinforcing strip of said second lever; hinge means connecting the intermediate portions of said levers together, comprising a metal sleeve in said second lever isolated from said reinforcing strip and a hinge pin extending through said sleeve and having the ends thereof engaging portions of said first lever; a cable connector at the rear end of said first lever; and spreader means between the rear ends of said levers for swinging said levers so as to cause said jaw elements to swing toward each other and grip a welding rod.

11. In a welding rod holder: first and second levers hingedly connected intermediate the ends thereof, said levers having jaw elements at the front ends thereof to grip a welding rod, said first lever being of electroconductive material and said second lever being of molded insulating material and having a reinforcing strip therein, said reinforcing strip being isolated from said first lever so that no electric current will flow in said reinforcing strip of said second lever; hinge means connecting the intermediate portions of said levers together, comprising a metal sleeve in said second lever isolated from said reinforcing strip and a hinge pin extending through said sleeve and having the ends thereof engaging portions of said first lever; an insulated handle on the rear end of said first lever, said handle being offset so that its axis extends through said hinge means; a cable connector at the rear end of said first lever; and spreader means between the rear ends of said levers for swinging said levers so as to cause said jaw elements to swing toward each other and grip a welding rod.

12. In a welding rod holder: first and second levers hingedly connected intermediate the ends thereof, said levers having jaw elements at the front ends thereof to grip a welding rod, said first lever being of electroconductive material and being the sole conductor of electric current to the welding rod, and said second lever being a nonconductor so that no electric current flows therethrough; an insulated handle on the rear end of said first lever, said handle being offset so that its axis extends through said hinge means; a cable connector at the rear end of said first lever for connection to an electric cable; and spreader means between the rear ends of said levers for swinging said levers so as to cause said jaw elements to swing toward each other and grip a welding rod.

13. In a welding rod rolder: first and second levers hingedly connected intermediate the ends thereof, said levers having jaw elements at the front ends thereof to grip a welding rod, said first lever being of electroconductive material and said second lever being of molded insulating material and having a reinforcing strip therein, said reinforcing strip being isolated from said first lever so that no electric current will flow in said reinforcing strip of said second lever; hinge means connecting the intermediate portions of said levers together; a cable connector at the rear end of said first lever; and means for swinging said levers so as to cause said jaw elements to swing toward each other and grip a welding rod.

14. In a welding rod holder: first and second levers hingedly connected intermediate the ends thereof, said levers having jaw elements at the front ends thereof to grip a welding rod, said first lever being of electroconductive material and being the sole conductor of electrical current to said welding rod, and said second lever being a nonconductor so that no electric current flows therethrough; hinge means connecting the intermediate portions of said levers together, comprising a metal sleeve in said second lever and a hinge pin extending through said sleeve and having the ends thereof supported by said first lever; a cable connector at the rear end of said first lever; and spreader means between the rear ends of said levers for swinging said levers so as to cause said jaw elements to swing toward each other and grip a welding rod.

15. In a welding rod holder: first and second levers hingedly connected intermediate the ends thereof, said levers having jaw elements at the front ends thereof to grip a welding rod, said first lever being of electroconductive material and being the sole conductor of electric current to said welding rod, and said second lever being a nonconductor so that no electric current flows therethrough; hinge means connecting the intermediate portions of said levers together; a cable connector at the rear end of said first lever; and means for swinging said levers so as to cause said jaw elements to swing toward each other and grip a welding rod.

16. In a welding rod holder: a first lever member of electroconductive material having an upwardly faced jaw member at the front end thereof; a second lever member adjacent the upper face of said first lever member having at the front end thereof a downwardly faced jaw member cooperating with said jaw member of said first lever member to grip a welding rod, said second lever member being a nonconductor and having a manually engageable handle which extends in spaced relation to the rearward portion of said first lever member; hinge means connecting said first and second lever members together adjacent said jaw members thereof; means for rotating said levers members so as to bring said jaw members together to grip a welding rod; and a handle for said first lever member disposed on a center line which extends between said first lever member and the handle portion of said second lever member for balancing said welding rod holder around said center line.

17. In a welding rod holder: a first lever member of electroconductive material having an upwardly faced jaw member at the front end thereof; a second lever member adjacent the upper face of said first lever member having at the front end thereof a downwardly faced jaw member cooperating with said jaw member of said first lever member to grip a welding rod, said second lever having a manually engageable handle which extends in spaced relation to the rearward portion of said first lever member; electrically insulated hinge means connecting said first and second lever members together adjacent said jaw members thereof without passage of electrical current from said first lever member through said hinge means; means for rotating said lever members so as to bring said jaw members together to grip a welding rod; and a handle for said first lever member disposed on a center line which extends between said first lever member and the handle portion of said second lever member for balancing said welding rod holder around said center line.

18. In a welding rod holder: a first lever member of electroconductive material having an upwardly faced jaw member at the front end thereof; a second lever member adjacent the upper face of said first lever member having at the front end thereof a downwardly faced jaw member cooperating with said jaw member of said first lever member to grip a welding rod, said second lever having a manually engageable handle which extends in spaced relation to the rearward portion of said first lever member; electrically insulated hinge means connecting said first and second lever members together adjacent said jaw members thereof without passage of electrical current from said first lever member through said hinge means; means for rotating said lever members so as to bring said jaw members together to grip a welding rod; and a handle for said welding rod holder connected to the rear end of said first lever member.

References Cited in the file of this patent

UNITED STATES PATENTS

| | | |
|---|---|---|
| 2,056,045 | Fansck | Sept. 29, 1936 |
| 2,270,724 | Brojitis et al. | Jan. 20, 1942 |
| 2,373,605 | Shellabarger | Apr. 10, 1945 |
| 2,404,028 | Best | July 16, 1946 |
| 2,423,058 | Van Dyke | June 24, 1947 |
| 2,695,944 | Donnelly | Nov. 20, 1954 |